United States Patent [19]

Becker et al.

[11] 3,971,459

[45] July 27, 1976

[54] HOUSING, INCLUDING READILY REMOVABLE PROTECTIVE PLATES, FOR MONORAIL ELECTRICAL COMPONENTS

[75] Inventors: Klaus Becker; Hartwig Sprung, both of Wetter, Germany

[73] Assignee: Demag Aktiengesellschaft, Duisburg, Germany

[22] Filed: Jan. 13, 1975

[21] Appl. No.: 540,693

[30] Foreign Application Priority Data
Jan. 15, 1974 Germany............................ 2401642

[52] U.S. Cl.................................. 191/30; 104/89; 104/119; 104/124; 191/32; 191/35; 191/40
[51] Int. Cl.².......................................... B60M 1/04
[58] Field of Search.......... 104/89, 94, 95, 118–120, 104/123–125; 191/13, 30, 32, 23 R, 23 A, 35, 40

[56] References Cited
UNITED STATES PATENTS
3,319,580 5/1967 Bohm............................ 104/118 X
3,511,186 5/1970 Barthalon ............................ 104/89

*Primary Examiner*—Stephen G. Kunin
*Attorney, Agent, or Firm*—Mandeville and Schweitzer

[57] ABSTRACT

A protective housing is provided for electrical rails and the like, namely, reaction (secondary) rails and slide pick-up lines for operating electro linear propulsion motors for monorail vehicles. The new and improved housing is of simplified construction and enables comparatively large protective plate members to be assembled in the form of a tight housing on elevated monorail structures. The protective plates may be readily removed and slidingly displaced to expose the normally protected electrical components for maintenance, replacement or repair.

16 Claims, 9 Drawing Figures

HOUSING, INCLUDING READILY REMOVABLE PROTECTIVE PLATES, FOR MONORAIL ELECTRICAL COMPONENTS

BACKGROUND OF THE INVENTION

The protective housings of the present invention are especially adapted and designed for use in monorail systems of the type in which an elevated monorail is supported by spaced, vertical columns or the like. These monorails support and are traversed by either bottom-supported and/or suspended vehicles. An exemplary monorail structure having both bottom-supported and suspended vehicles traveling therealong on upper and lower flights is disclosed in the applicants earlier U.S. Pat. No. 3,760,737, for a "Monorail", issued Sept. 25, 1973.

In known and earlier monorail systems, the electrical rail components, e.g., the sliding lines for current pick-up, are usually attached to electrical cable carriers. It is common practice to utilize small, protective casings for the electrical cables in which one longitudinal edge of the casing is mounted on the cable carrier, while the longitudinal edge is left unsecured (see German Pat. Nos. 1,284,984 and 1,274,618). This type of protective housing is extremely rigid due to its comparatively small dimensions, and the free longitudinal edge of the casing will bend only under extraordinary circumstances. Folding protective housings have been proposed in Australian Pat. No. 203,544, however, folding is only possible with extremely small housing members, since larger housing members require, of course, considerable space for folding.

SUMMARY OF THE PRESENT INVENTION

In accordance with the principles of the present invention, a simple, protective housing for electrical rail components and the like attached to monorails is provided in which the housing is comprised essentially of comparatively large sized, easily removable plates. The plates are readily removable from their installed positions despite their large dimensions for the purposes of maintenance, repair, of otherwise providing access to the protected electrical components. The new housing achieves the aforementioned objectives by utilizing a specially configured horizontally extending profile rail which provided a tight, impermeable, rigid, firm and continuous horizontal support of an edge of the housing plate. The edge of the housing plate thus supported provides sufficient stability to the plate that it is able to resist stresses such as developed by gusts of wind and the like that the plates cannot be bent. The opposite edges of the plates (those not "tightly" supported throughout their length by the profile rail) are "loosely" secured at predetermined spacings to the support structure for the profile rail. The support structure is typically a series of vertically extending elements which themselves are supported by cantilever arms or the like from the monorail beam. The aforementioned general arrangement may be used to construct protective housings for the electrical components for bottom supported railway vehicles, top supported railway vehicles, or both.

In accordance with another aspect of the present invention, the supporting profile rail for the housing plates includes an auxiliary groove which is arranged adjacent the normal support groove for the housing plate. The housing plate may be readily removed from its normal position, even during high winds, without difficulty and placed in the auxiliary groove and slid next to and into an overlapping relationship with an adjacent, non-removed plate of the housing structure. The thus removed plate will provide an access opening to inspect or repair the exposed electrical components, however, it will be retained within the general confines of the housing structure and immediately adjacent to the access opening. The removed plate may be secured to an adjacent installed plate by a tension spring cord clamped at one end to the non-removed stationary plate and secured to the removed plate by means of a loop on the tension cord supported on a small anchor post attached to the removed plate. To avoid scratching of the superimposed plates, the interior edges may be provided with an appropriate cushioning element. Alternatively, comparable cushioning elements may be disposed at the tension cord and they may rest between the exterior surfaces of the stationary plate and the interior surfaces of the superimposed, removed plate.

The protective plates employed in the present invention are of comparatively large sizes, i.e., approximately two meters in length and one meter in height. In order to clamp the free edges of the housing (those not supported in the profile rail) to the supports of the girder, special rotary snap catches may be employed. The snap element consists of a spreadable contracting spring having bent shoulder portions which cooperate with flattened retaining surfaces formed in a cylindrical expanding mandrel. The end of the mandrel extends through an elongated slot or the like in the support plate. In order to loosen the housing plate, the expanding mandrel is turned (with a screwdriver or the like) 90°, whereby the edges of the expanding mandrel spread the contracting spring until the tapered end surfaces of the expanding mandrel rest beneath the contracting spring causing the ejection of the mandrel from the slot. In order to fasten the plate, the expanding mandrel is turned so that its retaining detent surfaces are aligned with the support shoulders of the contracting spring. Then the mandrel is pushed into the spring, and the contracting spring shoulders snap into engagement with detent surfaces of the expanding mandrel.

For elevated girders for bottom-supported (above rail) and/or suspended (below rail) vehicles, the profile rail may have two continuous "tight" connections and two auxiliary grooves for upper and lower plates. The profile rail free edge may be provided with a rim for support of the upper edge of the lower plate. A suspending auxiliary profile rail may be supported in the outmost groove. The auxiliary profile extends laterally outwardly and terminates in a support rim adapted to suspend a lower housing plate. The auxiliary profile rail is preferably of a length greater than that of two plates so that it covers the space of the plate to be removed as well as that of an adjacent plate, thus facilitating the moving of the removed plate. The auxiliary profile rail is offset to such an extent, with respect to the main profile, that the plate to be moved does not subject the one beneath it to scratching.

In order to prevent any rain water from entering into the grooves of the main profile rail and to avoid freezing of the plates in the profile rail, one of the grooves of the profile rail is provided with a profile seal, having its upper lip resting at the upper plate and its lower lip resting on the bead of the lower plate and/or the beaded rim. The water running off the upper plate runs over the lips of the seal profile and over the bead of the lower plate, so that no water accumulates in the profile rails and freezes there. Furthermore, the seal profile offers protection against other contaminants that might jeopardize of interfere with the proper reinstallation of a removed plate.

In accordance with another aspect of the invention, a slot is provided in the main profile for supporting an auxiliary profile horizontally under the continuous or tight connection of plate rail. A ratchet-like projection is formed in the upper wall of the slot, and a pawl-like tab formed on an arm of the auxiliary profile lockingly cooperates therewith. The support for the main profile is provided with a cushioned contact surface for the housing plate when it is in installed position, and is provided with a clamping tab for stabilizing the removed plate in a temporary position.

When desired or found to be necessary to decrease noise generation and transmission, the plates may be mounted in the continuous or tight connection groove of the profile rail upon interposed vibration absorbers. These vibration absorbers prevent the transmission of vibrations in a plate to the profile rail and vice versa. Moreover and in accordance with the invention, the plates are preferably made of asbestos cement and are, therefore, less likely to cause noises than thin sheets of the same size. Significantly, this preferred material is inexpensive and weather-resistant.

For a more complete understanding of the present invention and a better appreciation of its attendant advantages, reference should be made to the following detailed description taken in conjunction with the accompanying drawings, in which like reference numerals refer to like parts throughout.

DESCRIPTION OF THE DRAWINGS

FIG. 3a is an enlarged, fragmentary view of detail "z" of FIG. 3;

DETAILED DESCRIPTION OF THE INVENTION

Figure 1:
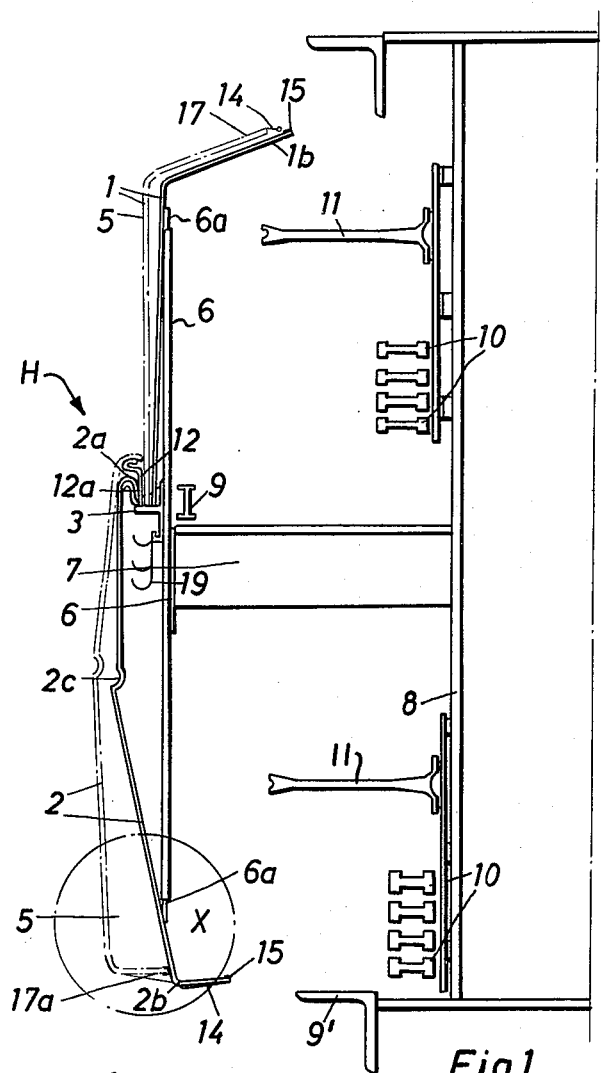
FIG. 1 is a cross-sectional view taken through half of a monorail girder for bottom-supported (above rail) and suspended (below rail) vehicles with upper and lower flights electrical rails and upper and lower housing plates for a housing embodying the principles of the invention.
Figure 1A:
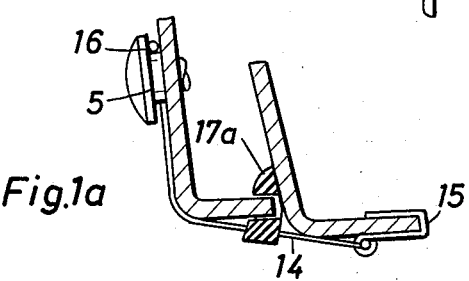
FIG. 1a is an enlarged, fragmentary view of detail "x" of FIG. 1.

FIG. 1 shows a box-shaped monorail girder 8 having upper and lower rails 9, 9', respectively, for bottom-supported (above rail) and suspended (top supported below rail) vehicles (not shown) having linear motors adapted to glide along secondary rails 11 and be supplied with current through the sliding line rails 10 and current pick-up carriages in known fashion. One side of the monorail girder 8 is provided with cantilevered spaced brackets which mount a series of vertical support plates 6 having free edges 6a in a longitudinally spaced relation. A special profile rail 3 (FIG. 4) is permanently secured to the vertical support plates 6 in suitable fashion (by welding or mechanical fasteners), and is provided at its upper portions with a "tight" or continuous groove 3a and an auxiliary groove 3b for bottom-supporting, upper housing plates 1, as well as a second auxiliary groove 3c for bottom-supporting an auxiliary profile rail 12 in "tight", sealed, face-to-face connection 3d. The uppermost portion of the profile ends in a beaded rim 3e which top-supports non-removed lower housing plates 2. The auxiliary rail 12 top-supports removed lower housing plates 2. The bottom of the profile rail 3 includes an integral keyway 3f for suspending a cable carrier 19 therefrom. The upper housing plates 1 rest in a continuous, filled, face-to-face or "tight" joint 3a and are attached to plate 6a by an expanding mandrel 5 device (see FIGS. 1a, 2 and 5). Auxiliary groove 3b bottom-supports another upper plate 1, shown in phantom, which is deposited there after it has been removed from its normal position in groove 3a, and which removed plate is temporarily secured by means of tension spring cord 14.

The tension spring cord 14 is anchored at one end by clamp 15 to a stationary non-removed plate 1, while a ring 16 at its other end is looped over the head of an expanding mandrel 5 (to be described more fully hereinafter). A protective bearing cushion 17 consisting of a foam rubber buffer or the like is attached to tension spring cord 14 and is disposed between the free lower ends of the superimposed plates 1. This arrangement is illustrated for lower housing plates 2 in FIG. 1a.

Figure 4:
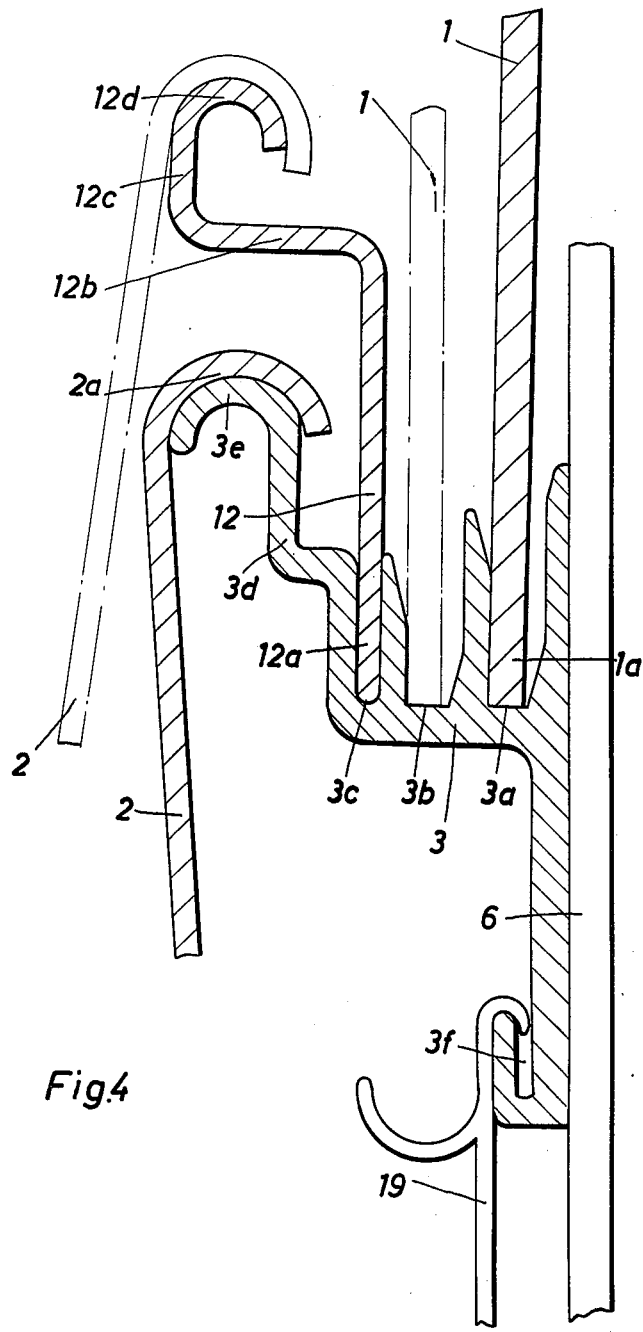
FIG. 4 is an enlarged, fragmentary view of the main and auxiliary profile rails in accordance with the invention.

The top longitudinal edge of each lower plate 2 is provided with a lip 2a; the opposite bottom edge 2b is bent inwardly for reasons of stability. The plates 2 have reinforcement ribs 2c, which also serve to separate applied coatings of different colors. The top lips 2a of the lower plates 2 hang on the matingly shaped beaded rims 3e of the profile rails 3. An auxiliary profile rail 12 with a seating leg 12a is supported in the groove 3c of the profile rail 3, as shown in FIG. 4. The auxiliary profile rail 12 has an offset 12b, a vertical leg 12c, and a support rim 12d for hanging a removed lower plate 2. The lower end of the removed plate 2 is fastened by means of tension spring cord 14 (plate 2 is indicated in phantom) in the manner described above for plates 1. The bottom edge of the lower plate 2 may be provided with U-shaped protective bearing cushion 17a (FIG. 1a) to prevent scratching, as will be understood. The housing arrangements in the drawings comprising generally the profile rails 3, plates 6, and housing plates 1, 2 have been designated generally by reference character "H".

Figure 2A:
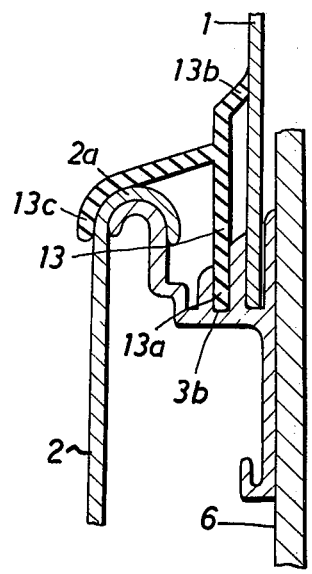
FIG. 2a is a fragmentary view of detail "y" of FIG. 2.
Figure 2:
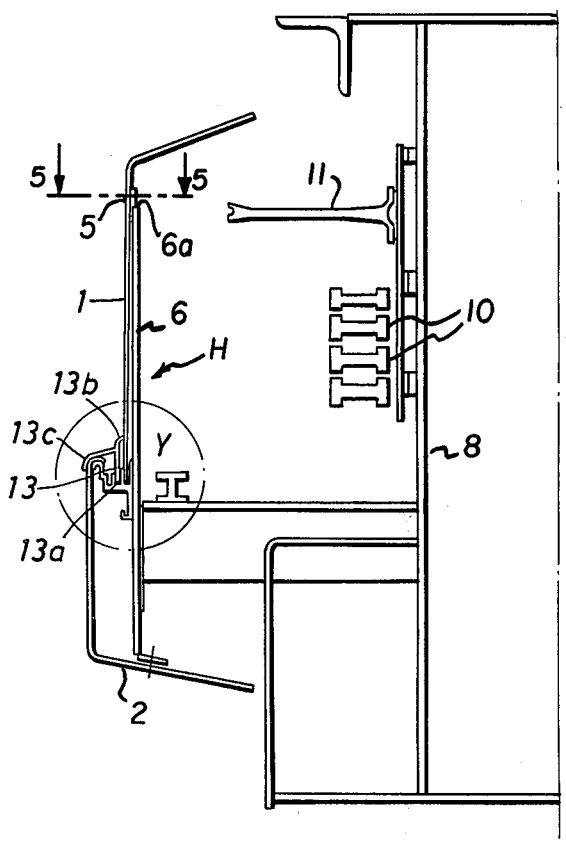
FIG. 2 is a cross-sectional view taken through half of a monorail girder for bottom-supported (above rail) vehicles showing a housing embodying the principles of the invention.
Figure 3:
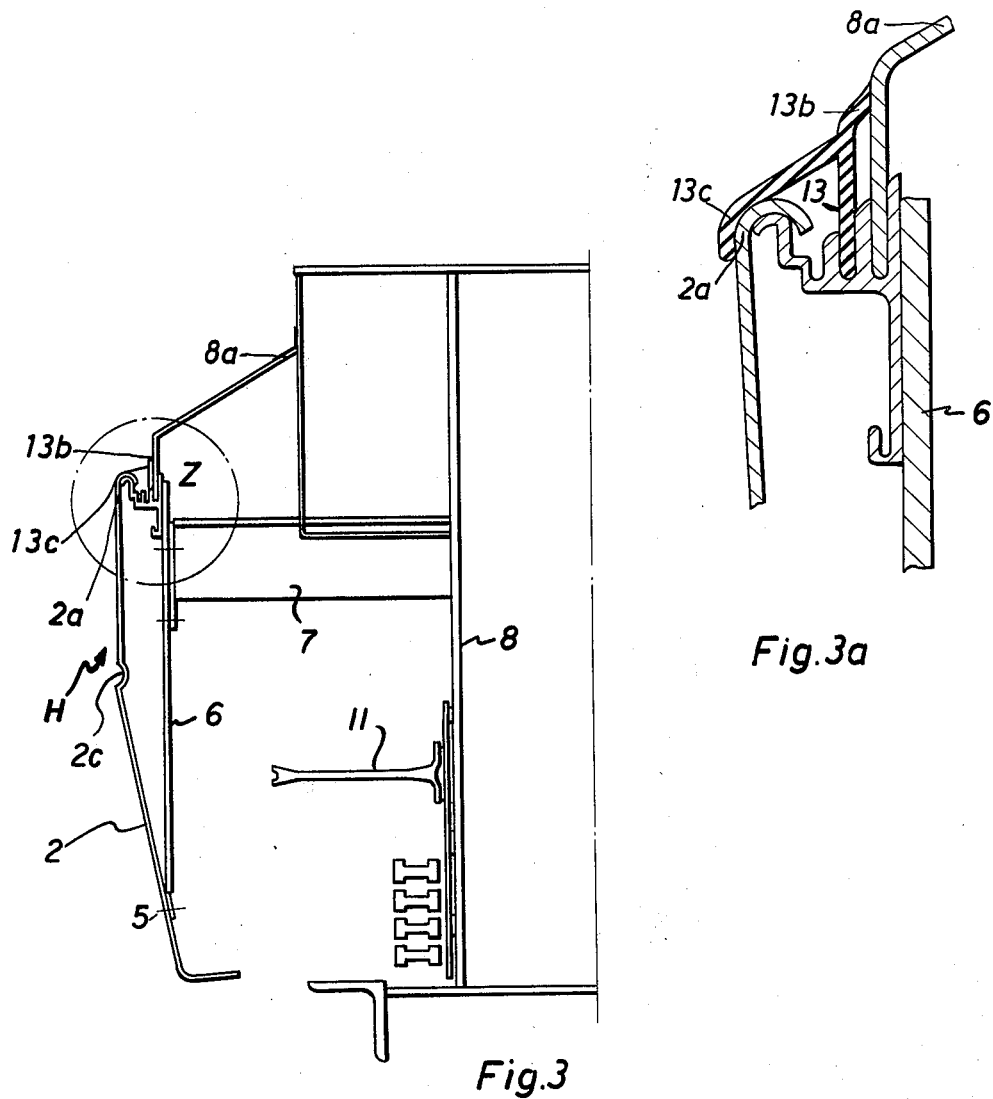
FIG. 3 is a cross-sectional view taken through half of a monorail girder for suspended vehicles (below rail) showing a housing embodying the principles of the invention.

FIGS. 2 and 2a show cross sections through half of a monorail girder for a bottom-supported vehicle and an associated housing having upper plates 1 and lower plates 2 sealed by an elongated elastomeric sealing profile element 13, having a vertical leg 13a from which sealing lips 13b, 13c laterally project. In this embodiment, lower plate 2 does not cover any electric cables and, therefore, is rarely removed. The vertical support leg 13a of the sealing profile 13 is mounted in groove 3b, while its upper sealing lip 13b bears against upper plate 1, and its lower sealing lip 13c bears against lip 2a of the lower plate 2. For a monorail girder for suspended rail vehicles, as shown in FIGS. 3 and 3a, the upper seal lip 13b of the sealing profile 13 rests against girder extension element 8a, and the lower sealing lip 13c rests on lip 2a.

Figure 5:
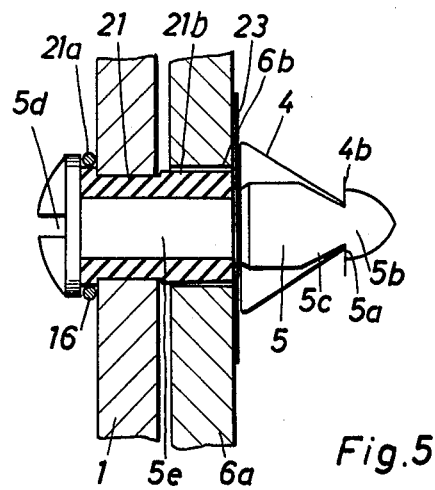
FIG. 5 is an enlarged, cross-sectional view of the fastening device employed in the new housing, taken along line 5—5 of FIG. 1.

FIG. 5 illustrates a quickly removable fastening device to hold the free ends of the housing plates 1 and/or 2 at the support plates 6a of the girder. The interior surface of support plates 6a is provided with a carrying (metal) sheet 23 having a U-shaped contracting spring 4 with converging legs disposed at a bore 6b. The ends of the legs project oppositely outwardly from each other and are bent to form locking shoulder surfaces 4b, which, in locked position, are arranged behind detent support surfaces 5a formed in an expanding mandrel 5. The mandrel, as shown, is a cylindrical body provided with a pointed nose 5b, which has locking indentations on two opposite sides, the surfaces nearest the nose forming the locking shoulders 5a, while the non-indented (cylindrical) surfaces form spreading surfaces or wedge 5c. The expanding mandrel 5 is provided with a screwdriver slot 5d for facilitating rotation. Its shaft 5e is seated (within a rubber sleeve 21 provided with a rim 21a) in the housing plates 1 and/or 2, as shown in the drawings. A thick portion 21b of rubber sleeve 21 extends into the bore 6b in the support plate 6a in order to establish a barrier to sound transmission. The rim of the rubber sleeve has a diameter smaller than the head of the expanding mandrel, so that the previously mentioned loop 16 of the tension spring cord 14 may be placed over the head of the expanding mandrel.

Figure 6:
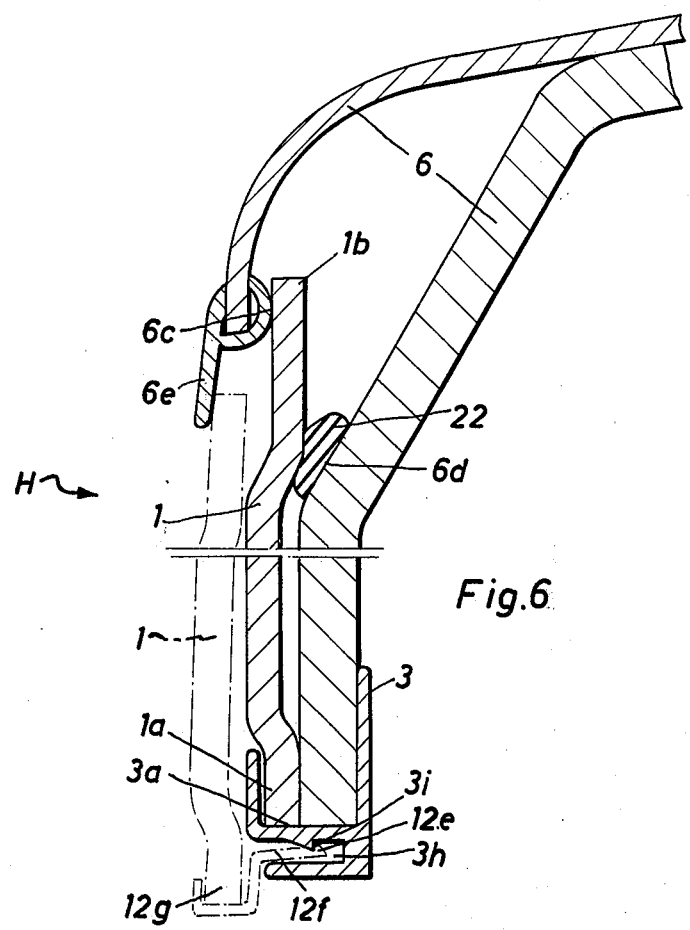
FIG. 6 is an alternative type of housing plate and its mounting embodying the principles of the invention.

FIG. 6 illustrates another type of upper housing plate 1. In the installed position, the plate 1 is clamped, with its upper longitudinal edge 1b, disposed behind the rear clamping surface 6c of the support 6. The plate 1 is urged against the contact surface 6d at a cushion 22. It is then placed into "tight" face-to-face sealing relation in groove 3a of the profile rail 3. The latter, in the FIG. 6 embodiment, is provided at the bottom with a horizontal groove 3h and a ratchet-like tooth 3i, depending into the groove from above. Cooperating with the ratchet element 3i is a pawl-like element 12e of a suspended auxiliary profile rail 12 which is carried by the arm 12f which is inserted into the groove 3h. The suspended auxiliary profile rail 12 is provided with a keyway 12g to accommodate one of the plates 1 after it is removed from its installed position. The upper longitudinal edge of the removed plate may be disposed behind the rear clamping tab 6e, in the manner shown in FIG. 6. Suction cups or other comparable handling means are utilized to handle the housing plates 1, 2 described hereinabove in installation and/or removal.

It should be understood, of course, that the several illustrated forms of the protective housing H for monorail electrical elements are intended to be representative only, as many changes may be made therein without departing from the clear teachings of the disclosure. Accordingly, reference should be made to the following appended claims in determining the full scope of the invention.

We claim:

1. A housing for a monorail girder mounting electrical rails, said housing including
   a. cantilever bracket means supporting a plurality of vertical support plates from said girder;
   b. an elongated longitudinally extending profile rail mounted to said support plates proximately of said electric rails;
   c. one horizontal longitudinal edge of each of said plates being tightly connected to said profile rail; and
   d. the other horizontal longitudinal edge of each of said plates being loosely connected with said support 2. A housing in accordance with claim 1, in which
   a. said profile rail is provided with a plurality of parallel grooves.

3. A housing in accordance with claim 2, in which
   a. a slot means for a suspended auxiliary profile rail is formed in said profile rail horizontally below said grooves.

4. A housing in accordance with claim 3, in which
   a. a ratchet-like projection extends into the slot means;
   b. a pawl-like projection of a suspended auxiliary profile rail lockingly cooperates with said ratchet-like projection.

5. A housing in accordance with claim 1, in which
   a. a plate removed from its installed position may be secured to a neighboring, non-removable plate by fastening means.

6. A housing in accordance with claim 5, in which
   a. said fastening means consists of a tension spring cord provided at one end with a suspension clamp means and at the other end with a loop means.

7. A housing in accordance with claim 1, in which
   a. said longitudinal edges of the plates remote from said profile rail carry protective cushions.

8. A housing in accordance with claim 1, in which
   a. a rotary snap fastening means is provided at said support plate to clamp said housing plates;
   b. said snap fastening means including spreadable contracting spring means which engage retaining surfaces of a flattened, cylindrical, pointed expanding mandrel, the end of which mandrel projects through said housing plate;
   c. said projecting end including a screwdriver slot means.

9. A housing in accordance with claim 1, in which
   a. said profile rail includes two tight main grooves, and two auxiliary grooves for supporting said upper and lower housing plates.

10. A housing in accordance with claim 9, in which
    a. said profile rail includes a beaded rim means for top-supporting upper lips of said lower plates.

11. A housing in accordance with claim 9, in which
    a. a suspended auxiliary profile rail may be inserted in one of said auxiliary grooves.

12. A housing in accordance with claim 11, in which
    a. a vertical leg of said auxiliary profile rail is seated in one of said auxiliary grooves;
    b. said auxiliary profile rail including a portion offset above the upper lip of the lower plate;
    c. said auxiliary profile rail is provided with a leg terminating in a rim for hanging a removed one of said lower plates.

13. A housing in accordance with claim 9, in which
    a. a sealing profile is supported in one of the auxiliary grooves of the profile rail and includes an upper seal lip resting at the upper plate and a lower seal lip resting on the lip of the lower plate.

14. A housing in accordance with claim 1, in which a. said support plates have contact surfaces and a rear clamping surface for the plates in installed position and a downward-projecting rear clamping tab for engaging temporarily removed plates.

15. A housing in accordance with claim 1, in which
a. the housing plates are seated in the tight connection of the profile rail;
b. vibration absorber means are interposed between said profile rails and said plates.

16. A housing in accordance with claim 1, in which
a. said plates are made of asbestos cement.

* * * * *